(12) United States Patent
Bousquet et al.

(10) Patent No.: US 10,089,536 B2
(45) Date of Patent: *Oct. 2, 2018

(54) ANALYSIS OF A MULTISPECTRAL IMAGE

(71) Applicant: Sagem Défense Sécurité, Boulogne-Billancourt (FR)

(72) Inventors: Marc Bousquet, Boulogne-Billancourt (FR); Maxime Thiebaut, Boulogne-Billancourt (FR); Nicolas Roux, Boulogne-Billancourt (FR); Philippe Foubert, Boulogne-Billancourt (FR); Thierry Touati, Boulogne-Billancourt (FR)

(73) Assignee: Sagem Défense Sécurité, Boulogne-Billancourt (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/100,212

(22) PCT Filed: Nov. 26, 2014

(86) PCT No.: PCT/EP2014/075714
§ 371 (c)(1),
(2) Date: May 27, 2016

(87) PCT Pub. No.: WO2015/078934
PCT Pub. Date: Jun. 4, 2015

(65) Prior Publication Data
US 2017/0024616 A1    Jan. 26, 2017

(30) Foreign Application Priority Data

Nov. 28, 2013 (FR) ...................................... 1361739

(51) Int. Cl.
*G06K 9/00* (2006.01)
*G06T 7/11* (2017.01)
(Continued)

(52) U.S. Cl.
CPC ....... *G06K 9/00771* (2013.01); *G06K 9/0063* (2013.01); *G06T 7/11* (2017.01);
(Continued)

(58) Field of Classification Search
CPC .. G06T 5/007–5/009; G06T 5/20–5/30; G06T 2207/10036; G06K 9/0063–9/00657
See application file for complete search history.

(56) References Cited

U.S. PATENT DOCUMENTS 8,897,571 B1 * 11/2014 Robinson ............. G06K 9/0063
250/339.01
2002/0165873 A1   11/2002 Kwok et al.
(Continued)

FOREIGN PATENT DOCUMENTS

FR           2 982 393 A1    5/2013
WO     2013/056198 A1    4/2013

OTHER PUBLICATIONS

International Preliminary Report on Patentability dated Feb. 26, 2016, issued in corresponding International Application No. PCT/EP2014/075714, filed Nov. 26, 2014, 10 pages.
(Continued)

*Primary Examiner* — Aaron W Carter
(74) *Attorney, Agent, or Firm* — Christensen O'Connor Johnson Kindness PLLC

(57) ABSTRACT

The invention relates to a method for analyzing a multispectral image (10), which includes designing a detection image from the values of a revealing function that quantifies a content shift in the multispectral image between two areas. The revealing function is applied between a target area and a background area, inside a window which is determined around each pixel. The revealing function values are determined from integral images of order one, and optionally also of order two, which in turn are calculated only once initially, (Continued)

so that the total amount of calculations is reduced. The analysis method is compatible with a real-time implementation during a capture of consecutive multispectral images which form a video stream, in particular for an environment-monitoring task.

20 Claims, 8 Drawing Sheets

(51) Int. Cl.
 G06T 7/174 (2017.01)
 G06T 7/136 (2017.01)
(52) U.S. Cl.
 CPC ............. *G06T 7/136* (2017.01); *G06T 7/174* (2017.01); *G06T 2207/10036* (2013.01); *G06T 2207/30232* (2013.01)

(56) References Cited

U.S. PATENT DOCUMENTS

| 2005/0047663 | A1* | 3/2005 | Keenan | G06K 9/0063 382/225 |
| 2013/0044963 | A1* | 2/2013 | Robinson | G06K 9/0063 382/260 |
| 2014/0321753 | A1* | 10/2014 | Roux | G06K 9/0063 382/191 |
| 2016/0275698 | A1* | 9/2016 | Agostini | G06T 5/50 |
| 2017/0024616 | A1* | 1/2017 | Bousquet | G06K 9/0063 |
| 2017/0024867 | A1* | 1/2017 | Bousquet | G06K 9/0063 |

OTHER PUBLICATIONS

Goudail, F., et al., "Some Practical Issues in Anomaly Detection and Exploitation of Regions of Interest in Hyperspectral Images," Applied Optics 45(21):5223-5236, Jul. 2006.
International Search Report dated Feb. 12, 2015, issued in corresponding International Application No. PCT/EP2014/075714, filed Nov. 26, 2014, 6 pages.
Porikli, F., and O. Tuzel, "Fast Construction of Covariance Matrices for Arbitrary Size Image Windows," Proceedings of the 2006 IEEE International Conference on Image Processing, Atlanta, Oct. 8-11, 2006, pp. 1581-1584.
Written Opinion dated Jul. 2, 2014, issued in corresponding French Registration No. 1361739, filed Nov. 28, 2013, 6 pages.
Notification of Defects (IL) dated Nov. 30, 2016, issued in corresponding Israeli Application No. 245871, 12 pages.

* cited by examiner

ANALYSIS OF A MULTISPECTRAL IMAGE

BACKGROUND

The present invention relates to a method for analyzing a multispectral image, and to a computer program for implementing such a method. It also relates to a method and a device for the surveillance of an environment.

The surveillance of an environment is a common task, particularly for intrusion detection. Such surveillance presents particular difficulties when carried out in a terrestrial environment. A terrestrial environment such as a rural area may contain a large number of different elements with irregular contours such as trees, bushes, rocks, buildings, etc., which makes it complex to interpret an image and search for intruding elements. In addition, in certain circumstances such as military surveillance, an intruding element may be camouflaged to make it more difficult to detect in the landscape. Usually such camouflage is effective against observation under visible light, particularly for wavelengths between 0.45 µm (micrometers) and 0.65 µm, and more particularly near 0.57 µm which corresponds to the maximum sensitivity of the human eye.

To successfully detect the intruding element, which is also called the "target" in the terminology of persons skilled in the art, despite a complex landscape and a possibly camouflaged target, it is known to perform a multispectral observation of the environment. Such multispectral observation consists of simultaneously capturing multiple images of the same landscape in different spectral bands, so that a target that does not clearly appear in images captured in some spectral bands is revealed by images corresponding to other spectral bands. Each spectral band may be narrow, with a wavelength range of a few tens of nanometers, or wider, possibly even very wide with a width of several micrometers, particularly when the spectral band is in one of the infrared domains: between 3 µm and 5 µm or between 8 µm and 12 µm. It is well known that observation in the wavelength range between 0.8 µm and 1.2 µm can be effective for revealing a target in an environment containing plant growth, when the target is effectively camouflaged against detection by observation within the light range visible to the human eye.

However, such multispectral detection may still not be sufficient to enable an operator responsible for surveillance to detect the presence of a target in a terrestrial environment. Indeed, in certain circumstances, none of the images separately associated with the spectral bands reveal the target clearly enough for the surveillance operator to detect the target in these images within the observation time allotted. Hereinafter, each image which separately corresponds to one of the spectral band is called the spectral image. For such situations, it is also known to improve the effectiveness of target detection by presenting the operator with an image constructed by Fisher projection. Such a process is known in particular from the article "Some practical issues in anomaly detection and exploitation of regions of interest in hyperspectral images" of Goudail F. et al., Applied Optics, Vol. 45, No. 21, pp. 5223-5236. According to this method, the image presented to the operator is constructed by combining at each dot of the image, called a pixel, the intensity values that were separately captured for a plurality of spectral bands, in order to optimize a contrast of the resulting image. Theoretically, this image construction consists of projecting for each pixel the vector of the intensities that have been captured for the spectral bands selected, in an optimal direction in the multidimensional space of the spectral intensity values. This optimal projection direction can be determined from the covariance matrix of the spectral intensities, estimated over the entire image field. In effect this means searching for a maximum correlation between the intensity variations that are present in the various images captured in the spectral bands selected. The contrast of the image presented to the operator is thus at least equal to that of each separate spectral image, so that target detection by the operator is both more efficient and more reliable. Alternatively, the optimal projection direction may be searched for directly by using a conventional optimization algorithm to maximize image contrast by varying the projection direction in the multidimensional space of the spectral intensities.

It is known to improve the contrast by Fisher projection within a spatial window which is smaller than the complete image. The surveillance operator selects the window within the complete image, particularly its position, based on the nature of the environment at that location in the image, and on his or her desire to intensify the search for a potential target in that area. To facilitate such a selection of the window position, and also to facilitate the identification and nature of an intrusion occurring in that area, it is also known to present the operator with a composite image on a screen. Such a composite image can be formed of one of the spectral images outside the window, and of the multispectral image portion resulting from the Fisher projection within the window. Alternatively, multiple spectral images having wavelength ranges within the range of sensitivity of the human eye can be used to display a representation of the landscape in natural or near-natural colors outside the window. However, in the composite image that is presented to the operator, the enhanced contrast provided by the Fisher projection is restricted to within the window. Because of this restriction, the surveillance operator does not have an enhanced-contrast visualization of the entire field of observation. He or she is therefore unable to quickly ascertain the extent of a camouflaged hostile intrusion, because of the time required to scan the entire field of observation with windows that must be successively selected and processed.

SUMMARY

This being the situation, a general object of the invention therefore consists of providing more reliable surveillance of an environment based on a multispectral image. In other words, a general aim of the invention is to further reduce the probability of non-detection of an intruding element in a scene that is captured in a multispectral image.

More particularly, the invention aims to provide the surveillance operator, in real-time, with an image of the field of observation in which the contrast is reinforced at all points of the image, based on the information contained in the multispectral image. In other words, the invention aims to provide the operator with an image of the field of observation which is improved in its entirety, is easily interpretable, and can be produced with a very short calculation time. Preferably, this calculation time is compatible with real-time streaming from a video camera which continuously captures successive multispectral images.

To achieve some of these or other aims, a first aspect of the invention provides a novel method for analyzing a multispectral image, when this multispectral image comprises a plurality of spectral images of the same scene but corresponding to different spectral ranges, each spectral image assigning an intensity value to each pixel, or dot of the image, which is located at an intersection of a row and a column of a matrix of the multispectral image, and an origin point being defined at a corner of the peripheral boundary of the matrix. According to the invention, a detection image is constructed by assigning a display value to each pixel of a working area of the matrix, this display value being obtained from a revealing function that quantifies a content shift in the multispectral image between two areas that are determined by this pixel. To do this, the method comprises the following steps:

/1/ calculating integral images of at least one of the following types:
  for each spectral image, a first-order integral image, by assigning to each calculation pixel an integral value equal to the sum of the intensity values of said spectral image for all pixels contained within a rectangle having two opposite vertices respectively located on the origin point and on the calculation pixel;
  for each pair of spectral images obtained from the multispectral image, a second-order integral image, by assigning to each calculation pixel another integral value equal to the sum, for all pixels contained within the rectangle having two opposite vertices respectively located on the origin point and on the calculation pixel, of products of the two intensity values relative to the same pixel but respectively assigned by each spectral image of the pair;
/2/ defining a fixed window frame and a mask internal to the frame, said mask defining a target area and a background area within the frame; and
/3/ for each pixel of the working area of the matrix, performing the following sub-steps:
  /3-1/ placing a window at a position in the matrix that is determined by the pixel, the window being delimited by the frame defined in step /2/;
  /3-2/ using the integral values read from the integral images calculated in step /1/ to determine a value of the revealing function that quantifies the content shift in the multispectral image between the target area and the background area within the window, in the position determined by the pixel; and
  /3-3/ assigning the value of the revealing function, calculated in sub-step /3-2/, to the pixel for which step /3/ is performed.

The values of the revealing function are used to construct the detection image, pixel by pixel, within the working area of the matrix.

Thus, a first feature of the invention is to provide the surveillance operator with an image that is constructed entirely from revealing function values resulting from localized processing of the multispectral image. This image, called the detection image, is homogeneous in its nature and in its method of calculation.

A second feature of the invention consists of using a method for calculating the revealing function that is based on integral images. First, the spectral images are converted into first- and/or second-order integral images, and then the revealing function is calculated from these integral images. Thus, the sums of the intensity values which are calculated for large numbers of pixels are only calculated once; the results of these sums are then read and combined to obtain the value of the revealing function for each pixel. With this structure of the analysis method, the method can be carried out very quickly without requiring significant computational resources. In particular, the analysis method of the invention is compatible with real-time streaming from a video camera which continuously captures multispectral images.

In addition, the use of a window smaller than the matrix to calculate the display value of each pixel in the detection image, allows this detection image to be easily interpreted visually by the surveillance operator. In other words, most of the patterns contained in the detection image can easily be recognized by the operator. Preferably, the window frame can have dimensions between one-fifth to one-fiftieth of those of the matrix, parallel to the rows and columns.

To increase a contrast of the detection image, the mask may advantageously be defined in step /2/ so that the target area and the background area are separated by an intermediate area within the window frame.

In possible implementations of the invention, the display value may be obtained from the value of the revealing function, for each pixel in the detection image, using one or a combination of the following methods:
  comparing the value of the revealing function to a threshold, and the display value is set to zero if this value of the revealing function is below the threshold, otherwise the display value is set to the value of the revealing function; or
  applying a linear scale conversion to the value of the revealing function, and the display value is set to the result of this conversion.

In simple implementations of the invention, step /1/ may include calculating the first-order integral images, and sub-step /3-2/ may include:
  /3-2-1/ determining two mean vectors for the target area and for the background area respectively, each having a coordinate, for each spectral image, which is equal to the mean of the intensity values of said spectral image, calculated for the pixels of the target area or of the background area respectively; then
  /3-2-2/ calculating the value of the revealing function from these two mean vectors.

In particular, the revealing function may be an angle between the two mean vectors in a multidimensional space which has the intensities for each spectral image as its axes. More generally, the revealing function may be dependent on this angle between the two mean vectors.

More generally, the method of the invention may only use first-order integral images. In this case, the second-order integral images are not necessarily calculated in step /1/.

However, step /1/ may include calculating first-order as well as second-order integral images, so that the value of the revealing function can be calculated in sub-step /3-2-2/ using integral values read from the second-order integral images, in addition to those read from the first-order integral images.

It is also possible for the method of the invention to use only the second-order integral images. In such an alternate case, the first-order integral images are not necessarily calculated in step /1/.

In particular implementations of the invention, sub-step /3-2/ may include a determination of a Fisher factor, in the form of a vector associated with a Fisher projection that increases a contrast of the multispectral image, within the window, between the target area and the background area. In this case, the Fisher factor itself can be calculated in sub-step /3-2/ for each pixel of the working area, from integral values read from the first- and second-order integral images. Execution of the analysis method of the invention is thus even faster. In particular, the Fisher factor can be calculated in step /3-2/ for each pixel of the working area, in the form of a product between a row vector resulting from a difference between the mean vectors calculated for the target area and for the background area, and an inverse covariance matrix. The covariance matrix concerned has a factor, for each pair of spectral images obtained from the multispectral image, which is equal to a covariance of the spectral intensity values respectively assigned by each spectral image of the pair, calculated for the pixels of the background area.

Optionally, sub-step /3-2/ may further comprise a calculation of two mean Fisher values, respectively for the target area and for the background area, each equal to a dot product of the Fisher factor and of the mean vector for the target area or for the background area respectively. In this case, the value of the revealing function may be dependent on the difference between the two mean Fisher values.

Some implementations of the first aspect of the invention may be adapted to the case where the multispectral image is part of a video stream comprising a series of multispectral images captured in succession. To do this, at least some steps of the analysis method are executed within an ordered chain of acquisition and calculation modules that are activated simultaneously and synchronously. These modules comprise, in order:

a first module, which is adapted for capturing and controlling the recording or storing of each multispectral image;
a second module, which is adapted for calculating the first-order and possibly second-order integral images for each multispectral image, and for controlling the recording or storing of each first- or second-order integral image;
a third module, which is adapted for calculating, for each multispectral image, at least the two mean vectors for the target area and for the background area respectively, for each pixel of that multispectral image within the working area; and
possibly a fourth module, which is adapted for calculating, for each multispectral image and each pixel thereof within the working area, at least the covariance matrix and the inverse covariance matrix.

In such an implementation of the invention, the modules operate simultaneously such that each one processes a different multispectral image than those of the other modules. These multispectral images, which are processed simultaneously by the modules, are chronologically successive in the video stream in the reverse order to that of the modules in the chain; then the video stream is shifted by one multispectral image relative to the chain of modules, so that the entire video stream is progressively analyzed during repeated simultaneous executions of the modules, separated by shifts of the video stream relative to the chain of modules. Such an implementation of the analysis method can process a video stream of multispectral images in real time.

A second aspect of the invention provides a medium readable by one or more processors, which comprises code written on said medium and able to cause the one or more processors to execute an analysis method according to the first aspect of the invention. This second aspect of the invention is therefore a computer program that has the nature of a commercial product or a product that can be exploited in some form.

A third aspect of the invention provides a method for the surveillance of an environment, which comprises the following steps:

simultaneously capturing a plurality of spectral images of the environment, in order to obtain a multispectral image;

analyzing the multispectral image using an analysis method according to the first aspect of the invention; and
displaying the detection image on a screen, for a surveillance operator who is monitoring the screen.

The surveillance method may further comprise a comparison of the display value of each pixel in the detection image with an alert threshold. A pixel may then also be displayed in this detection image with a modified color, with flashing, or with an overlay, if the display value exceeds the alert threshold. The attention of the surveillance operator is thus further drawn to that location in the field of observation, so that he or she can determine whether an intruding element is present.

Finally, a fourth aspect of the invention provides a device for the surveillance of an environment, which comprises:

means for storing a multispectral image formed of a plurality of spectral images of the same scene but which are associated with separate spectral ranges;
a screen comprising pixels that are respectively located at the intersections of the rows and columns of a matrix;
an image processing system adapted for calculating integral images from the spectral images and for storing these integral images;
means for defining a window frame and a mask internal to the frame, said mask defining a target area and a background area within the frame; and
a calculation system that is adapted to implement step /3/ of an analysis method according to the first aspect of the invention, and to display a detection image on the screen, wherein each pixel of a working area of the matrix has a display value which is obtained from the value of the revealing function calculated for that pixel.

Such a device can be adapted to process a video stream of multispectral images by applying one of the analysis methods according to the invention to each of the multispectral images. To do so, the storage means for the multispectral image may comprise the first module already described, which is adapted for capturing and controlling the recording or storing of each multispectral image;
the image processing system may comprise the second module which is adapted for calculating the first-order and possibly second-order integral images; and
the calculation system may comprise the third module which is adapted for calculating, for each multispectral image, at least the two mean vectors for the target area and for the background area respectively, for each pixel of that multispectral image within the working area, and may possibly further comprise the fourth module which is adapted for calculating, for each pixel of that multispectral image within the working area, at least the covariance matrix and the inverse covariance matrix.

The device then further comprises a controller which is adapted for controlling the simultaneous and synchronous operation of the modules, in order to analyze the series of successive multispectral images that form the video stream. In this manner, the modules operate simultaneously such that each one processes a multispectral image that is different from those of the other modules, and the multispectral images processed simultaneously by the modules are chronologically successive in the video stream in the reverse order to that of the modules in the chain. The controller is further adapted for controlling the shift of the video stream by one multispectral image relative to the chain of modules, so that the entire video stream is progressively analyzed during repeated simultaneous executions of the modules, separated by shifts of the video stream relative to the chain of modules.

To further improve the video stream processing speed, it is possible for the third module to comprise two sub-modules that are respectively and separately dedicated to calculating the mean vector for the target area and the mean vector for the background area, with simultaneous operation of these sub-modules for each multispectral image and each pixel thereof within the working area. Each module or sub-module may comprise at least one dedicated calculation unit, for example a dedicated processor.

BRIEF DESCRIPTION OF THE DRAWINGS

Other features and advantages of the invention will be apparent from the following description of some non-limiting exemplary implementations, with reference to the accompanying drawings in which:

FIG. 9b shows a second architecture for a surveillance device according to the invention, adapted for analyzing a series of successive multispectral images forming a video stream, applying the implementation of FIG. 6a.

DETAILED DESCRIPTION

For clarity, the dimensions of the elements represented in some of the figures do not correspond to their actual dimensions or to their actual dimensional ratios. In addition, when identical references are indicated in different figures, these denote identical elements or elements having identical functions.

Figure 1:
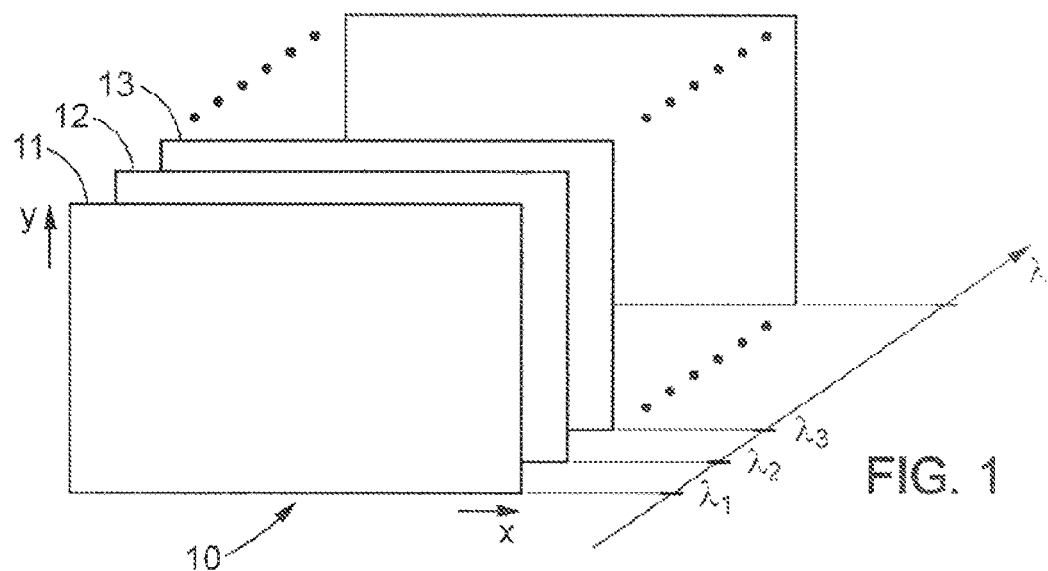
FIG. 1 is a schematic representation of a multispectral image.

Reference 10 in FIG. 1 denotes a general multispectral image formed of several individual images 11, 12, 13, . . . that were simultaneously captured of the same scene. In other words, the individual images 11, 12, 13, . . . were captured by imaging pathways arranged in parallel, activated simultaneously, and having the same optical field of capture. However, each image 11, 12, 13, . . . was captured by selecting a portion of the radiation from the scene, which is distinct from the radiation portion used for each of the other images 11, 12, 13, . . . . This distinction is made based on the wavelength $\lambda$ of the radiation, in a manner known to the skilled person, so that each of the images 11, 12, 13, . . . , called a spectral image, was captured for radiation of a wavelength within a distinct range, preferably without overlapping any of the ranges of the other spectral images. The number of spectral images 11, 12, 13, . . . may be arbitrary, for example equal to twenty spectral images, each associated with a wavelength range whose width may be between several nanometers and several tens of nanometers or more. Such a multispectral image may also be called hyperspectral, depending on the number of spectral images it is composed of and the width of each of their wavelength ranges. For example, $\lambda_1, \lambda_2, \lambda_3, \ldots$ denote center values for the respective wavelength ranges of the spectral images 11, 12, 13, . . . . Depending on the application of the invention, these intervals may be between 400 nm (nanometer) and 1 μm (micrometer), or between 400 nm and 2.5 μm, for example.

Each spectral image 11, 12, 13, . . . may be processed for the invention using a file that is read from a storage medium, or from a digital stream that is produced by an image capturing device at a video stream rate. Depending on the case, the image data may be raw data produced by one or more image sensors, or data already processed for certain operations such as cropping spectral images relative to one another, correction of under- or overexposure, etc.

Figure 2:
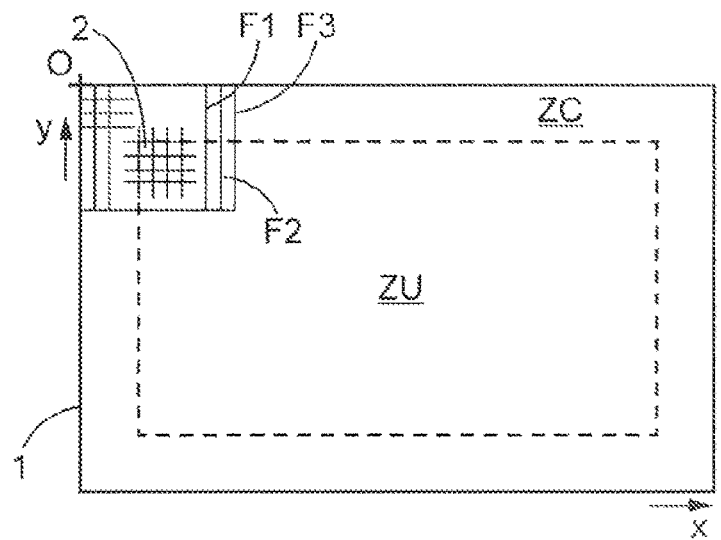
FIG. 2 represents a display screen used to implement the invention.

FIG. 2 shows a screen for displaying the multispectral image 10. It comprises a matrix 1 of image dots 2, or pixels 2, which are arranged at the intersections of the rows and columns of the matrix. For example, the matrix 1 may contain 500 columns and 500 rows of pixels 2. x and y respectively denote the direction of the rows and columns. An origin point O is set at a corner of the peripheral boundary of the matrix 1, for example the top left. Each of the spectral images 11, 12, 13, . . . separately assigns an intensity value to each pixel 2 of the matrix 1. Such assignment is direct if each spectral image is directly captured according to matrix 1, or may be indirect if at least some of the spectral images 11, 12, 13, . . . are captured according to a different matrix. In that case, an intensity value for each pixel 2 of the matrix 1 can be obtained by interpolation, for each spectral image having a different initial matrix than matrix 1.

Figure 3A:
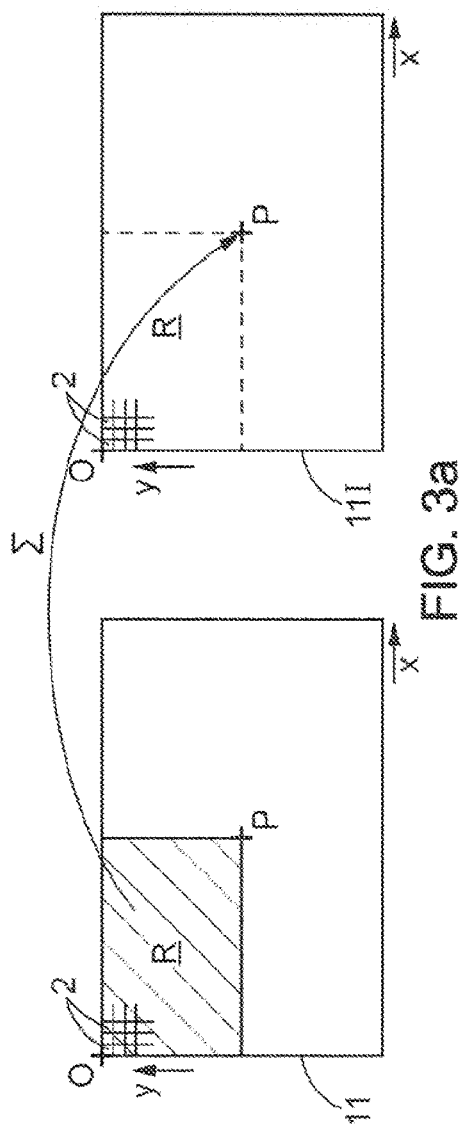
FIGS. 3a and 3b illustrate the principles of constructing integral images used to implement the invention.

An integral image is calculated separately for each spectral image 11, 12, 13, . . . , according to a common calculation principle known to the skilled person. Reference 11i in FIG. 3a denotes the integral image calculated from spectral image 11. The value of pixel P in integral image 11i is calculated as the sum (Σ sign in FIG. 3a) of all intensity values in image 11, for the pixels 2 of the matrix 1 that are contained within a rectangular area R in which two opposite corners are the origin point O and the pixel P itself. The integral images so calculated were called first-order integral images in the general description of the invention, and the values of each of them for the pixels 2 of the matrix 1 were called integral values.

Figure 3B:
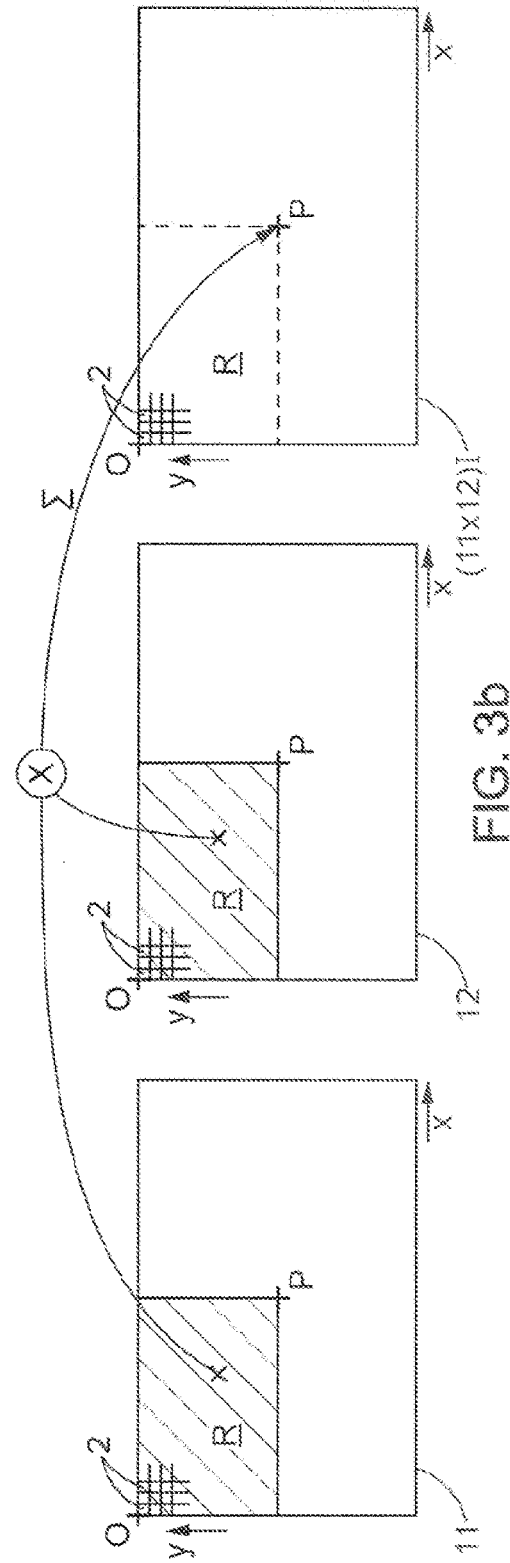

FIG. 3b illustrates the principle of calculating the second-order integral image which is obtained from spectral images 11 and 12. This integral image is indicated by reference (11×12)I. Its integral value for pixel P is calculated as follows: for each pixel 2 of the rectangular area R having as opposite corners the origin point O and pixel P itself, the product of the two intensity values that are assigned to pixel 2 by spectral images 11 and 12 is calculated (product operator in FIG. 3b). Then these products are added together for area R, and the result of the sum represents the integral value of integral image (11×12)I at pixel 2. Second-order integral images are calculated in a similar manner for all possible pairs of the spectral images 11, 12, 13, . . . , including pairs in which both spectral images are the same. Obviously, pairs containing two images that are identical from one pair to another but are selected in reverse order, correspond to second-order integral images that are identical, so they are only calculated once.

All first- and second-order integral images are stored or saved (step S1 of FIG. 5), so that the integral values can be quickly read as the method proceeds.

Windows F1, F2, F3, . . . are then successively selected within the matrix 1 so that the matrix is scanned (FIG. 2). Each window is defined by a frame having preferably fixed dimensions, and by a placement position of the frame within the matrix 1. For example, window F1 can be placed at the top left corner of the matrix 1, then window F2 is obtained by shifting the window frame one column to the right relative to window F1, etc., until the window frame reaches the right edge of the matrix 1. Scanning can then continue by returning to the left edge of the matrix 1 but one row of pixels lower, etc. By associating each placement of the frame with the pixel 2 of the matrix 1 that is located at the center of the window so formed, a working area denoted ZU is progressively traveled by the successive window centers, excluding a complementary area ZC which results from edge effects. Area ZU corresponds to the extent of the detection image constructed according to the invention.

Figure 4:
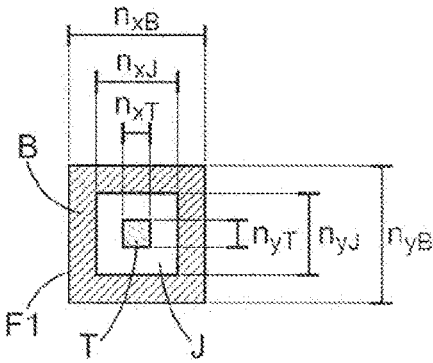
FIG. 4 represents a mask that can be used to calculate a contrast within a window, in certain implementations of the invention.

A fixed mask is also defined within the window frame, and is shifted along with said frame to each position of the frame in the matrix 1 when a different window is selected. This mask defines a target area denoted T and a background area denoted B within the window frame. For example, as represented in FIG. 4, the target area T and the background area B can have respective square boundaries, be concentric, and be separated by an intermediate area denoted J. $n_{xB}$ and $n_{yB}$ denote the external dimensions of the background area B in directions x and y. They correspond to the dimensions of the window frame, for example each equal to 51 pixels. $n_{xT}$ and $n_{yT}$ denote the dimensions of the target area T in directions x and y, for example each equal to 7 pixels, and $n_{xJ}$ and $n_{yJ}$ denote the external dimensions of the intermediate area J, for example each equal to 31 pixels. The values of $n_{xB}$ and $n_{yB}$, $n_{xT}$ and $n_{yT}$, $n_{xJ}$ and $n_{yJ}$ can be selected based on an assumption concerning the size of the intruding element being searched for in the imaged scene and its distance away.

The construction of the detection image is now described with reference to FIG. 5 and FIGS. 6a and 6b, for two different implementations of the invention respectively. For each of these separate implementations, the same sequence of steps described for window F1 is repeated for each pixel 2 of the working area ZU.

Figure 7:
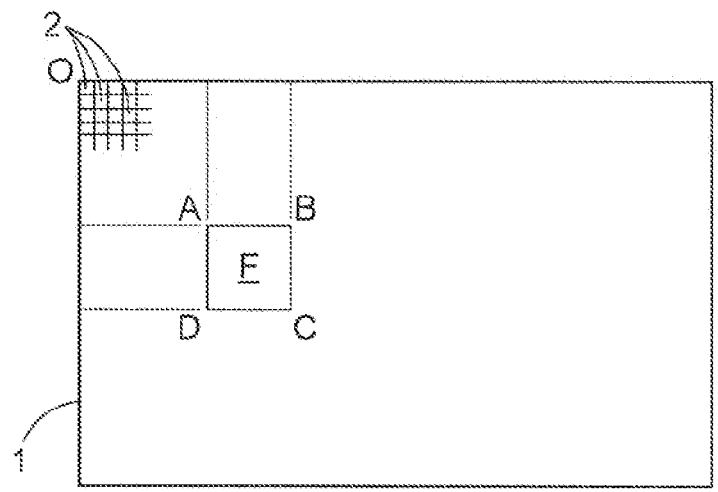
FIG. 7 illustrates the principle of calculating mean vectors which is used in the invention.

The intensity values of each pixel 2 of the target area T and of the background area B, in window F1, are considered for the d spectral images 11, 12, 13, . . . which together constitute the multispectral image 10, d being an integer greater than or equal to two. A vector of spectral intensities is then constructed for the target area T as follows: it has a separate coordinate for each of the spectral images, and this coordinate is equal to the mean of all intensity values of all pixels of the target area T in that spectral image. Thus, the following vector can be constructed:

$$\vec{m}_T = \frac{1}{N_T} \begin{bmatrix} \sum_{i \in T} x_1(i) \\ \sum_{i \in T} x_2(i) \\ \vdots \\ \sum_{i \in T} x_d(i) \end{bmatrix}$$

where i is an index which numbers the pixels in the target area T, $x_1(i), x_2(i), \ldots, x_d(i)$ are the intensity values of pixel i in respective spectral images 11, 12, 13, . . . , and $N_T$ is the number of pixels of the target area T. In a space of intensities for the d spectral images, vector $m_T$ corresponds to an average position of the vectors of spectral intensities for all pixels of the target area T. in other words, $m_T$ is the mean vector of spectral intensities for the target area T. As is known, each coordinate of vector $m_T$ can be calculated directly from the corresponding first-order integral image, in the following manner which is illustrated in FIG. 7:

$$\sum_{i \in T} x_k(i) = \text{Imint}_k(A) + \text{Imint}_k(C) - \text{Imint}_k(B) - \text{Imint}_k(D)$$

where k is the index of the coordinate of vector $m_T$, less than or equal to d; A, B, C, and D are the pixels of the vertices of window F, Im $\text{int}_k(A)$ is the integral value at pixel A which is read from first-order integral image k, and so on in the same manner for pixels B, C, and D.

Figure 8:
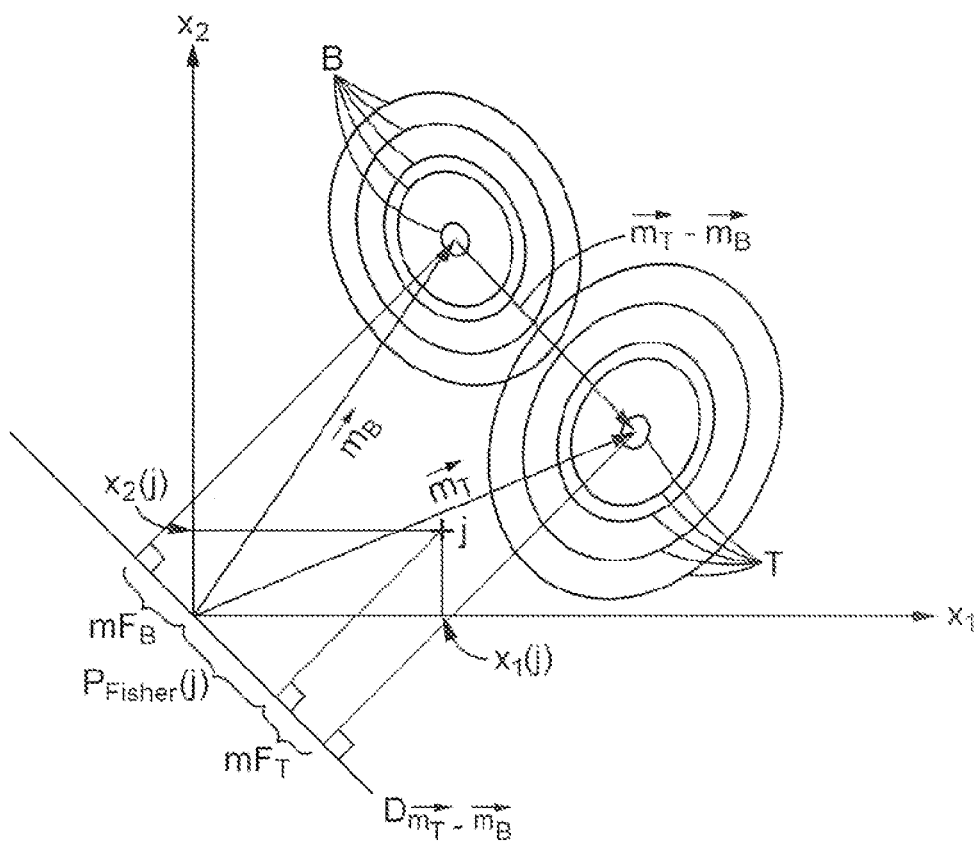
FIG. 8 illustrates the principle of a Fisher projection in a two-dimensional space of spectral intensities.

Another vector of spectral intensities is similarly constructed for the background area B:

$$\vec{m}_B = \frac{1}{N_B} \begin{bmatrix} \sum_{i \in B} x_1(i) \\ \sum_{i \in B} x_2(i) \\ \vdots \\ \sum_{i \in B} x_d(i) \end{bmatrix}$$

where $N_B$ is the number of pixels of the background area B. It is generally but not necessarily different from the number $N_T$. The vector $m_B$ similarly corresponds to an average position of the vectors of spectral intensities of all pixels of the background area B. It is called the mean vector of spectral intensities for the background area B. Vector $m_B$ can also be calculated from first-order integral images, in a manner that is adapted to the shape of the background area B but is easily accessible to the skilled person. Vectors $m_T$ and $m_B$ are arranged in columns and each has d coordinates. FIG. 8 shows vectors $m_B$ and $m_T$ in the case of two spectral images (d=2). In this figure, the concentric ellipses denoted T and B symbolize curves for the levels associated with constant values for the numbers of pixels in the target area T and in the background area B.

Figure 6A:
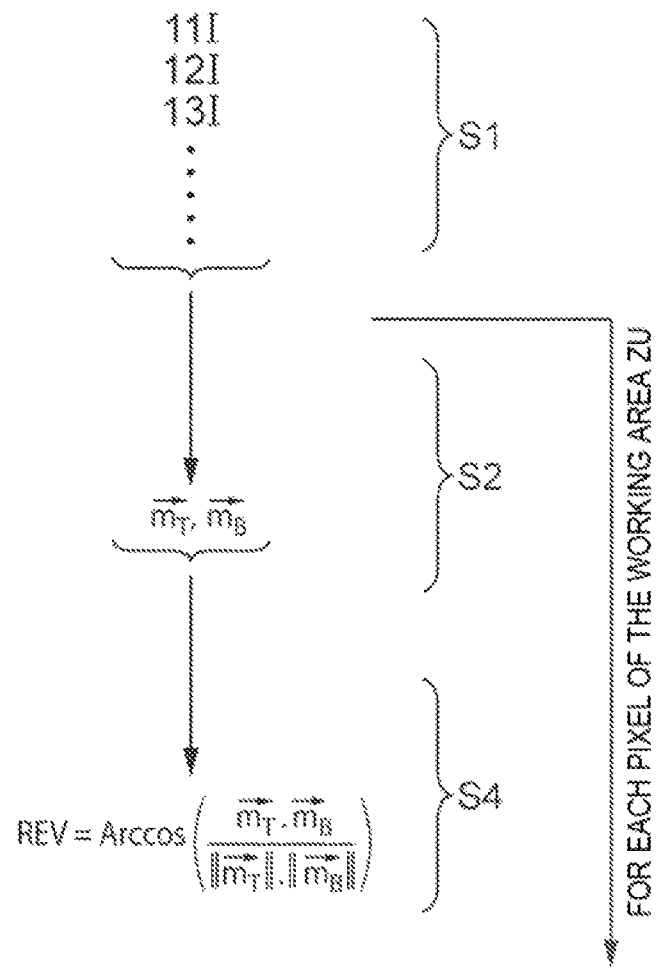
FIGS. 6a and 6b show the sequence of calculations performed in certain steps of the method of FIG. 5, for two different implementations of the method.
Figure 6B:
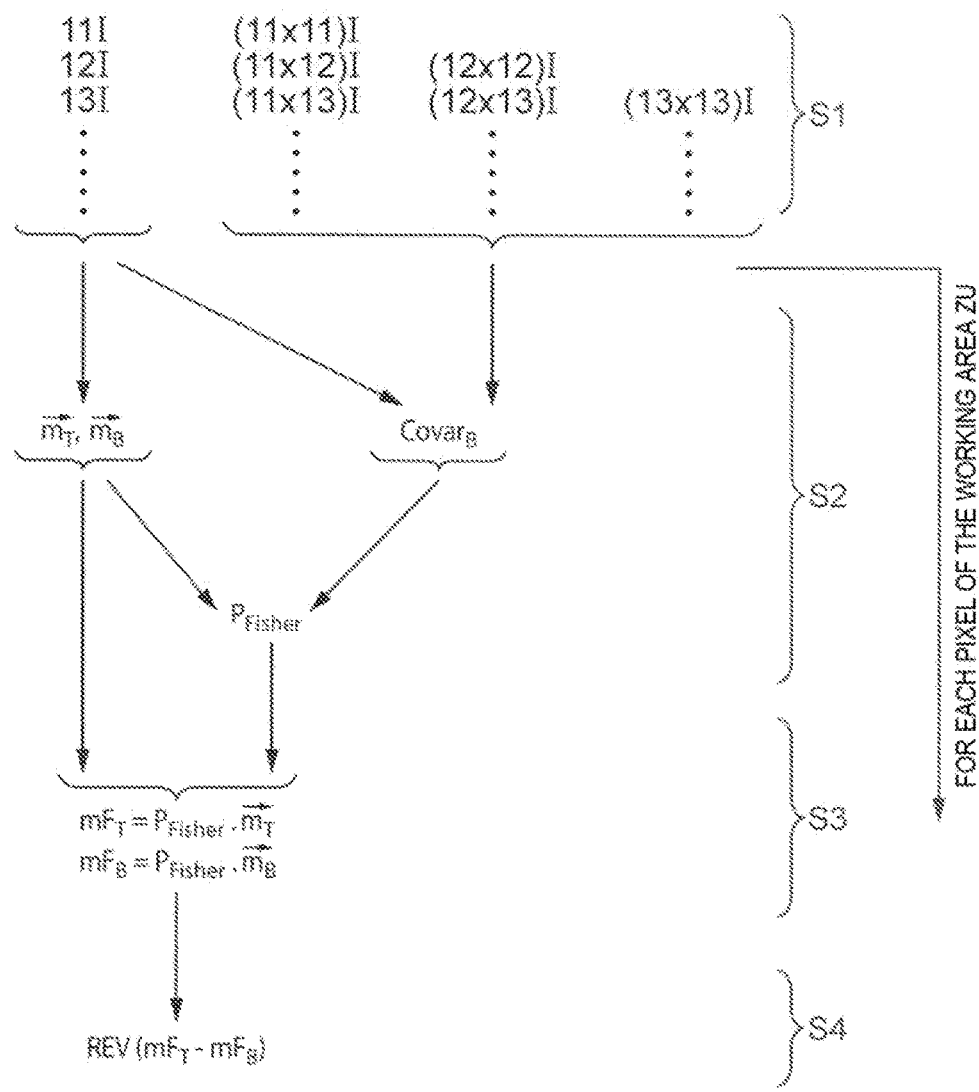

The two implementations of FIGS. 6a and 6b use the mean vectors $m_T$ and $m_B$ calculated in step S2. REV denotes the revealing function used to construct the detection image. Its value for the pixel of the detection image being calculated is determined in step S4.

For the implementation of FIG. 6a, the revealing function REV is equal to the angle of separation between the two mean vectors $m_T$ and $m_B$ in the space of spectral intensities. It can be calculated using the following formula:

$$REV = \text{Arccos}\left( \frac{\vec{m}_T \cdot \vec{m}_B}{\|\vec{m}_T\| \cdot \|\vec{m}_B\|} \right)$$

where Arc cos denotes the inverse function of cosine, · in the numerator denotes the dot product of the two mean vectors $m_T$ and $m_B$, and the double vertical bars indicate the norm of each vector. The value of the REV function resulting from this implementation can be expressed in any of the conventional angle units.

The implementation of the invention which is illustrated in FIG. 6b is based on finding a maximum contrast between the contents of the multispectral image 10 which are located in the target area T and in the background area B.

This maximum contrast value is the value resulting from application of the Fisher projection to the multispectral content of window F1. To do this, the Fisher projection itself is determined first. It may be determined using one of the known methods. However, the method now described is preferred because it makes use of the integral images that have already been calculated.

In addition to the mean vectors $m_T$ and $m_B$, step S2 also comprises the calculation of the following covariance matrix from the intensity values of the pixels 2 of the background area B:

$$\text{Covar}_B = \begin{bmatrix} \text{Var}(x_1, x_1) & \text{Covar}(x_2, x_1) & \ldots & \text{Covar}(x_d, x_1) \\ \text{Covar}(x_1, x_2) & \text{Var}(x_2, x_2) & \ldots & \text{Covar}(x_d, x_2) \\ \vdots & \vdots & \ddots & \vdots \\ \text{Covar}(x_1, x_d) & \text{Covar}(x_2, x_d) & \ldots & \text{Var}(x_d, x_d) \end{bmatrix}$$

where $\text{Var}(x_1, x_1)$ is the variance of the intensity values of spectral image 11 calculated over the pixels of the background area B, $\text{Covar}(x_1, x_2)$ indicates the covariance of the respective intensity values of spectral images 11 and 12 calculated over the pixels of the background area B, etc., for all pairs of index values selected from among 1, 2, . . . d. The matrix $\text{Covar}_B$ is square, of size d. It can be determined in a manner again known to the skilled person, based on second-order integral images and on the components of vector $m_B$.

The Fisher projection $P_{Fisher}$ may also be determined in this step S2, as follows:

$$P_{Fisher} = (\vec{m}_T - \vec{m}_B)^t \cdot \text{Co var}_B^{-1}$$

where the superscript t denotes the transpose of a vector, the exponent −1 denotes the inverse of a matrix, and · denotes the matrix product operation, here applied between row vector $(m_T - m_B)^t$ and matrix $\text{Covar}_B^{-1}$. The Fisher projection expressed in this way is a row vector with d coordinates. Usually, it is intended to be applied to the vector of intensity values for each pixel of window F1 in the form of the following matrix product:

$$P_{Fisher}(j) = P_{Fisher} \cdot \begin{bmatrix} x_1(j) \\ x_2(j) \\ \vdots \\ x_d(j) \end{bmatrix}$$

where j indicates the pixel in window F1, and $P_{Fisher}(j)$ is the intensity value for pixel j which results from the Fisher projection applied to the vector of intensity values for said pixel j in the d spectral images. In the terminology of the skilled person, the projection $P_{Fisher}$ that is determined for the selected window, when expressed as a row vector to be multiplied with a column vector by a dot product operation, is called a Fisher factor. The set of intensity values $P_{Fisher}(j)$ obtained for all pixels j of the window is called the Fisher matrix. FIG. 8 also shows the Fisher projection in the space of spectral intensities, for the exemplary case of two spectral images: d=2. The references introduced above are used again in this figure. The Fisher matrix obtained in this manner for window F1 is a representation of the content of the multispectral image 10 within window F1, which has the maximum contrast. $D_{mT-mB}$ is the direction in which the vectors of spectral intensities of the pixels j are projected, according to the Fisher method.

The invention is based on using the maximum contrast present within the Fisher matrix, without needing to calculate the matrix itself. This results in a significant gain in calculation time, which is one of the advantages of the invention.

The mean of the intensity values of the Fisher matrix within the target area T is, for the window in question:

$$mF_T = \frac{1}{N_T} \cdot \sum_{i \in T} P_{Fisher}(i)$$

Similarly, the mean of the intensity values of the Fisher matrix within the background area B is, for the same window:

$$mF_B = \frac{1}{N_B} \cdot \sum_{i \in B} P_{Fisher}(i)$$

However, the inventors have discovered that the means $mF_T$ and $mF_B$ could be expressed in the following ways:
mean $mF_T$ is equal to the Fisher factor applied to the mean vector of spectral intensities for the target area T: $mF_T = P_{Fisher} \cdot m_T$, where · indicates the dot product operation between the row vector of $P_{Fisher}$ and the column vector of $m_T$; and
similarly, mean $mF_B$ is equal to the Fisher factor applied to the mean vector of spectral intensities for the target area B: $mF_B = P_{Fisher} \cdot m_B$.

Figure 5:
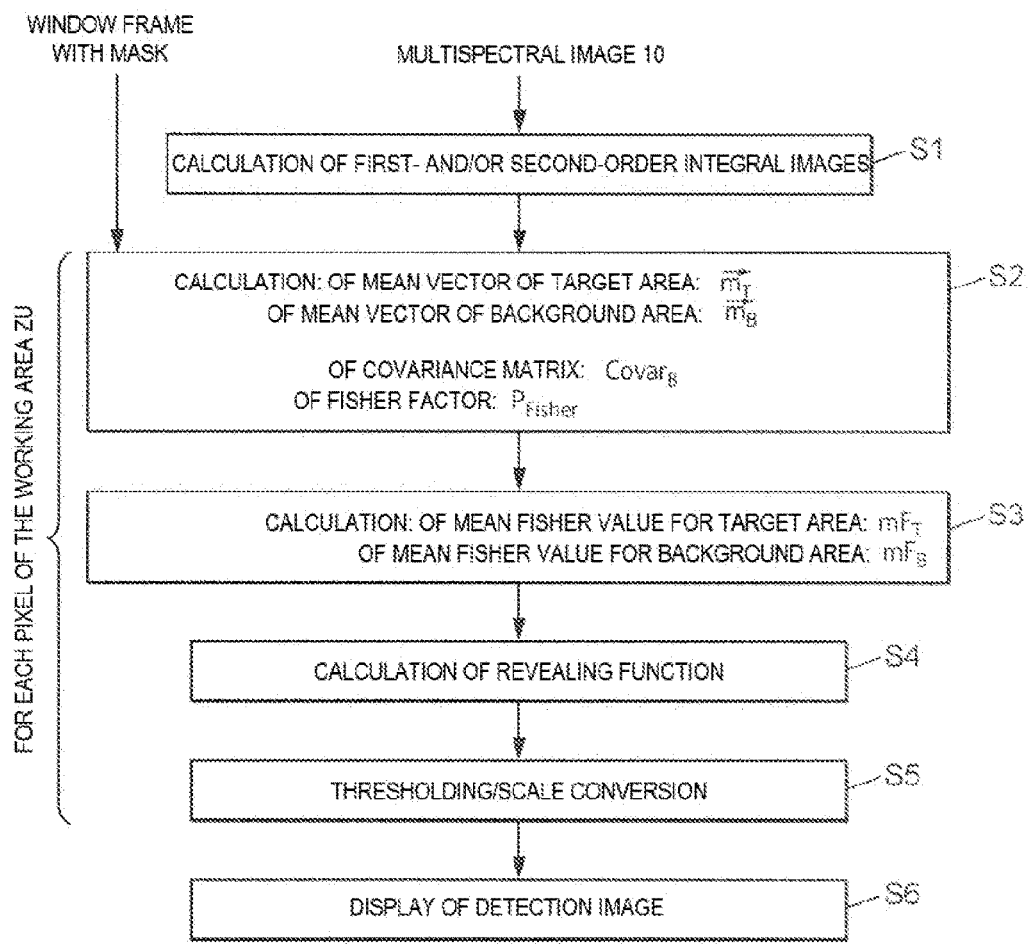
FIG. 5 is a block diagram of steps of a method according to the invention.

Step S3 in FIGS. 5 and 6b consists of calculating means $mF_T$ and $mF_B$ in this manner. FIG. 8 also shows these mean Fisher values $mF_T$ and $mF_B$ along direction $D_{mT-mB}$.

Then, in step S4, the revealing function REV is dependent on the difference $mF_T - mF_B$. Typically, REV can be monotonic, continuous, increasing, or decreasing, relative to difference $mF_T - mF_B$, but it can also be a monotonic function that increases or decreases stepwise.

For all embodiments of the invention, the value of the revealing function REV that was calculated for a position of the window in the matrix 1, is assigned to the pixel 2 of the working area ZU which determined this position. In the implementations provided as examples, it is assigned to the pixel 2 on which the window is centered.

One will recall that the value of the revealing function was calculated for each pixel 2 of the working area ZU, from only first-order and/or second-order integral images. These integral images were only calculated once beforehand, in step S1. Considerable computation is thus avoided, rendering the method of the invention compatible with real-time execution as successive multispectral images are captured, received in a video stream, or read from a storage medium.

Optionally, the values of the revealing function REV may themselves be processed in step S5, in particular to make the detection image more easily understandable to the surveillance operator. Such processing may consist of comparing each value of the REV function to a threshold or to multiple thresholds, and changing the value according to the result of the comparison. For example, the value of the REV function for any of the pixels in the working area ZU may be reduced to zero when it is initially below a first threshold. Simultaneously, the value of the REV function may be increased to a maximum value when it is greater than a second threshold, so that the pixel concerned appears more clearly in the detection image. The attention of the surveillance operator can thus be drawn more forcefully to this location in the detection image. The first and/or second threshold may be fixed, or may be determined according to a statistical study of all values of the REV function which have been obtained for all pixels 2 of the working area ZU. For example, each threshold can be calculated based on a mean value of the REV function, calculated over the pixels 2 of the working area ZU. Processing of the REV function values may also include a linear scale conversion, in particular so that the variation in amplitude of the REV function over the working area ZU coincides with the amplitude of the display intensity of pixels in the detection image. Thus, a value of zero for the display intensity can be assigned to the minimum value obtained for the REV function in the working area ZU, and the maximum value for the display intensity can be simultaneously assigned to the maximum value reached by the REV function in the working area ZU. A display intensity value then results from such a linear conversion, for each intermediate value of the REV function that is between the minimum and maximum values. It is possible to combine the processing for thresholding and scale conversion.

The detection image is then constructed by assigning a display value to each pixel 2 in the working area ZU of the matrix 1. This display value may be directly equal to the value of the revealing function REV which was obtained for that pixel in step S4, or may result from that value of the REV function after the processing of step S5. The detection image is then displayed on the screen in step S6, for observation by the surveillance operator. It is possible to alternate displaying this detection image with a representation of the surveillance field that reproduces the visual perception by the human eye, meaning a perception based on light within the visible wavelength range and coming from the field of observation. The operator is thus assisted in identifying the location of elements revealed by the detection image in the surveillance field, when these elements are invisible to the human eye directly.

Various effects may optionally be added in the detection image to further emphasize locations where the revealing function has produced display values that exceed an alert threshold. These effects may be a color display of the pixels concerned, and/or flashing of said pixels, and/or the addition of an overlay. The alert threshold may be predefined or may be derived from a statistical study of revealing function values or display values in the working area ZU.

Figure 9A:
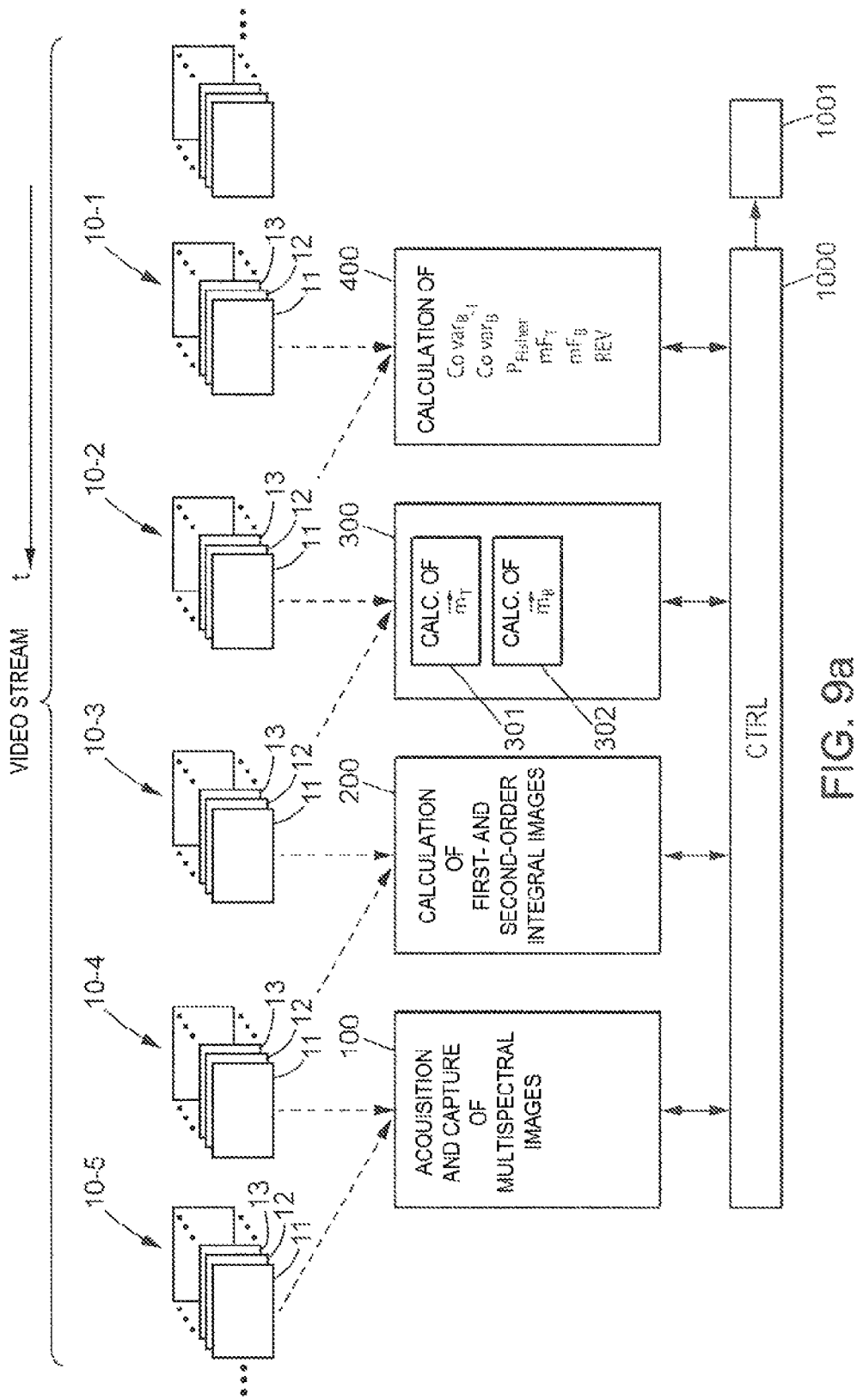
FIG. 9a shows a first architecture for a surveillance device according to the invention, adapted for analyzing a series of successive multispectral images forming a video stream, applying the implementation of FIG. 6b.

In FIG. 9a, references 10-1, 10-2, . . . , 10-5 denote multispectral images which are successively captured to form a video stream. The horizontal arrow pointing to the left indicates the flow of time t for the chronological order of the multispectral images in the video stream. FIG. 9a also shows a surveillance device architecture that is adapted for analyzing such a video stream of multispectral images. This architecture may include at least four modules, denoted 100, 200, 300, and 400, which are each dedicated to the following tasks:

module 100 for the acquisition, capture, and possibly also the calibration of each multi spectral image 10-1, 10-2, . . . , 10-5;

module 200 for calculating the first-order integral images $1_1I$, $1_2I$, $1_3I$, . . . and second-order integral images $(1_1 \times 1_1)I$, $(1_1 \times 1_2)I$, . . . for each of the multi spectral images 10-1, 10-2, . . . , 10-5;

module 300 for calculating the two mean vectors $m_T$ and $m_B$, respectively for the target area T and for the background area B. It is possible for these two calculations to be executed separately and simultaneously by two dedicated sub-modules 301 and 302 within module 300; and module 400 for calculating the covariance matrix $\text{Co var}_B$ and its inverse $\text{Co var}_B^{-1}$.

Module 400 may also handle calculating the Fisher factor, the mean Fisher values $mF_T$ and $mF_B$ for the target area T and for the background area B respectively, and the value of the revealing function REV.

Modules 100, 200, 300, and 400 form a chain in that order. A controller 1000 coordinates the operations of the modules 100-400, and transfers to a screen 1001 the detection image constructed for each of the multispectral images 10-1, 10-2, 10-3, . . . of the video stream. Each module stores the results of its calculations for each multispectral image in dedicated registers, so that the results are accessible to the downstream modules in the chain. The controller 1000 synchronizes the operations of the four modules so that they are performed one-on-one for four successive multispectral images in the video stream, as shown by the dotted vertical arrows. Module 100 thus acquires for example multispectral image 10-4 at the same time as module 200 calculates integral images $1_1I$, $1_2I$, $1_3I$, . . . and $(1_1 \times 1_1)I$, $(1_1 \times 1_2)I$, . . . for multispectral image 10-3, and at the same time as module 300 calculates mean vectors $m_T$ and $m_B$ for multispectral image 10-2, and also at the same time as module 400 calculates the covariance matrix $\text{Co var}_B$ and its inverse $\text{Co var}_B^{-1}$ for multispectral image 10-1. When this session of operations has completed, the controller 1000 commands a change of multispectral image for each of the modules, corresponding to a right shift of one multispectral image in the video stream of FIG. 9a (dotted diagonal arrows). In a new session of operations for the four modules, module 100 acquires multispectral image 10-5 at the same time as module 200 calculates integral images $1_1I$, $1_2I$, $1_3I$, and . . . $(1_1 \times 1_1)I$, $(1_1 \times 1_2)I$, . . . for multispectral image 10-4, and at the same time as module 300 calculates mean vectors $m_T$ and $m_B$ for multispectral image 10-3, and at the same time as module 400 calculates the covariance matrix $\text{Co var}_B$ and its inverse $\text{Co var}_B^{-1}$ for multispectral image 10-2. In this manner, all multispectral images of the video stream are progressively analyzed, and the resulting detection images are successively displayed on the screen 1001.

It is possible for the calculations of the Fisher factor, the mean Fisher values $mF_T$ and $mF_B$ for the target area T and the background area B respectively, and the value of the revealing function REV, to be performed by a fifth module distinct from module 400, or by the controller 1000. Similarly, the thresholding and scale conversion operations that may be applied to the values of the revealing function REV in order to obtain each detection image may alternatively be performed by module 400, the possible fifth module, or the controller 1000.

Figure 9B:
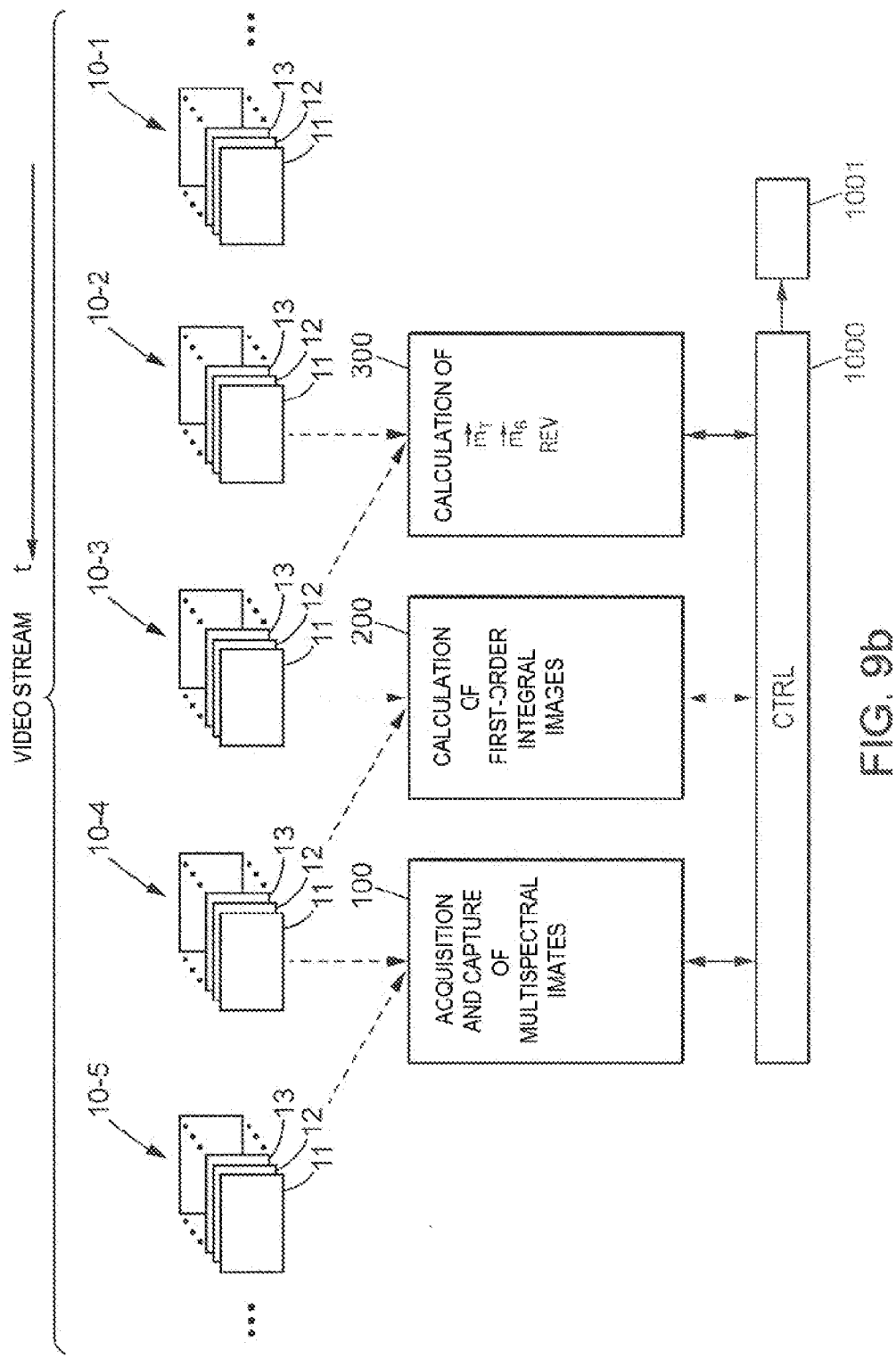

FIG. 9b corresponds to FIG. 9a, replacing the implementation of FIG. 6b with that of FIG. 6a. In this case, three modules instead of four can be sufficient in the chain that processes the real-time video stream, due to the reduced calculations for finding the values of the revealing function. FIG. 9b can be understood from the explanations provided for FIG. 9a, and further comments are unnecessary for FIG. 9b.

It is understood that the invention can be reproduced by changing secondary aspects of the implementations detailed above, while retaining the primary advantages mentioned above and restated again here:

a detection image that is consistent and constructed in a homogeneous manner is presented to the surveillance operator so as to reveal camouflaged items present in the field of observation;

these uncovered elements can be recognized by the operator from the detection image;

the detection image can be calculated and presented to the operator in real time during the surveillance task; and the invention enables real-time processing of a video stream of multispectral images.

Finally, the target area and the background area which are determined by the mask in the window frame can have various shapes, as long as these shapes are each composed of one or more rectangles or squares. In particular, it is not essential that the background area be continuous around the target area.

The invention claimed is:

1. A method for analyzing a multispectral image, said multispectral image comprising a plurality of spectral images of the same scene but corresponding to different spectral ranges, each spectral image assigning an intensity value to each pixel located at an intersection of a row and a column of a matrix of the multispectral image, and an origin point being defined at a corner of the peripheral boundary of the matrix;

wherein a detection image is constructed by assigning a display value to each pixel of a working area of the matrix, said display value being obtained from a revealing function that quantifies a content shift in the multispectral image between two areas that are determined by said pixel;

the method comprising the steps of:

/1/ calculating integral images of at least one of the following types:

for each spectral image, a first-order integral image, by assigning to each calculation pixel an integral value equal to the sum of the intensity values of said spectral image for all pixels contained within a rectangle having two opposite vertices respectively located on the origin point and on said calculation pixel;

for each pair of spectral images obtained from the multispectral image, a second-order integral image, by assigning to each calculation pixel another integral value equal to the sum, for all pixels contained within the rectangle having two opposite vertices respectively located on the origin point and on said calculation pixel, of products of the two intensity values relative to the same pixel but respectively assigned by each spectral image of the pair;

/2/ defining a fixed window frame and a mask internal to the frame, said mask defining a target area and a background area within said frame; and /3/ for each pixel of the working area of the matrix, performing the following sub-steps:

/3-1/ placing a window at a position in the matrix that is determined by the pixel, said window being delimited by the frame defined in step /2/;

/3-2/ using the integral values read from the integral images calculated in step /1/ to determine a value of the revealing function that quantifies the content shift in the multispectral image between the target area and the background area within the window, in the position determined by said pixel; and /3-3/ assigning the value of the revealing function, calculated in sub-step /3-2/, to the pixel for which step /3/ is performed, wherein the display value is obtained from the value of the revealing function, for each pixel in the detection image, using one or a combination of the following methods:

comparing the value of the revealing function to a threshold, and the display value is set to zero if said value of the revealing function is below the threshold, otherwise said display value is set to said value of the revealing function; or applying a linear scale conversion to the value of the revealing function, and the display value is set to the result of the conversion.

2. The method according to claim 1, wherein the window frame has dimensions between one-fifth to one-fiftieth of the dimensions of the matrix parallel to the rows and columns.

3. The method according to claim 1, wherein the mask is defined in step /2/ so that the target area and the background area are separated by an intermediate area within the window frame.

4. The method according to claim 1, wherein step /1/ includes calculating the first-order integral images, and sub-step /3-2/ includes:

/3-2-1/ using integral values read from the first-order integral images, determining two mean vectors for the target area and for the background area respectively, each having a coordinate, for each spectral image, which is equal to the mean of the intensity values of said spectral image, calculated for the pixels of the target area or of the background area respectively; then /3-2-2/ calculating the value of the revealing function from said two mean vectors.

5. The method according to claim 4, wherein the revealing function is an angle between the two mean vectors in a multidimensional space which has the intensities for each spectral image as its axes, or is dependent on said angle.

6. The method according to claim 1, wherein step /1/ includes calculating first-order as well as second-order integral images, and in sub-step /3-2-2/, the value of the revealing function is calculated using integral values read from the second-order integral images, in addition to integral values read from the first-order integral images.

7. The method according to claim 1, wherein sub-step /3-2/ includes a determination of a Fisher factor, in the form of a vector associated with a Fisher projection that increases a contrast of the multispectral image, within the window, between the target area and the background area.

8. The method according to claim 6, wherein sub-step /3-2/ includes a determination of a Fisher factor, in the form of a vector associated with a Fisher projection that increases a contrast of the multispectral image, within the window, between the target area and the background area, and wherein the Fisher factor is itself calculated in sub-step /3-2/ for each pixel of the working area, from the integral values read from the first- and second-order integral images.

9. The method according to claim 4, wherein step /1/ includes calculating first-order as well as second-order integral images, and in sub-step /3-2-2/, the value of the revealing function is calculated using integral values read from the second-order integral images, in addition to integral values read from the first-order integral images, wherein sub-step /3-2/ includes a determination of a Fisher factor, in the form of a vector associated with a Fisher projection that increases a contrast of the multispectral image, within the window, between the target area and the background area, wherein the Fisher factor is itself calculated in sub-step /3-2/ for each pixel of the working area, from the integral values read from the first- and second-order integral images, wherein the Fisher factor is calculated in step /3-2/ for each pixel of the working area, in the form of a product between a row vector resulting from a difference between the mean vectors calculated for the target area and for the background area, and an inverse covariance matrix, said covariance matrix having a factor, for each pair of spectral images obtained from the multispectral image, which is equal to a covariance of the spectral intensity values respectively assigned by each spectral image of the pair, calculated for the pixels of the background area.

10. The method according to claim 4, wherein sub-step /3-2/ includes a determination of a Fisher factor, in the form of a vector associated with a Fisher projection that increases a contrast of the multispectral image, within the window, between the target area and the background area, wherein sub-step /3-2/ comprises a calculation of two mean Fisher values for the target area and for the background area respectively, each equal to a dot product of the Fisher factor and of the mean vector for the target area or for the background area respectively;

and the value of the revealing function is dependent on the difference between said two mean Fisher values.

11. The method according to claim 4, wherein the multispectral image is part of a video stream comprising a series of successively captured multispectral images;

wherein at least some of the steps of the method are executed within an ordered chain of acquisition and calculation modules that are activated simultaneously and synchronously, said modules comprising, in order:
a first module adapted for capturing and controlling the recording or storing of each multispectral image;
a second module adapted for calculating the first-order integral images, and for controlling the recording or storing of each first-order integral image; and
a third module adapted for calculating, for each multispectral image, at least the two mean vectors for the target area and for the background area respectively, for each pixel of said multispectral image within the working area; and
wherein the modules operate simultaneously such that each one processes a different multispectral image than those of the other modules, said multispectral images processed simultaneously by the modules being chronologically successive in the video stream in the reverse order to that of the modules in the chain, the video stream then being shifted by one multispectral image relative to the chain of modules, so that the entire video stream is progressively analyzed during repeated simultaneous executions of the modules, separated by shifts of the video stream relative to the chain of modules.

12. The method according to claim 9, wherein sub-step /3-2/ includes a determination of a Fisher factor, in the form of a vector associated with a Fisher projection that increases a contrast of the multispectral image, within the window, between the target area and the background area, wherein sub-step /3-2/ comprises a calculation of two mean Fisher values for the target area and for the background area respectively, each equal to a dot product of the Fisher factor and of the mean vector for the target area or for the background area respectively;

and the value of the revealing function is dependent on the difference between said two mean Fisher values;

wherein the multispectral image is part of a video stream comprising a series of successively captured multispectral images;

wherein at least some of the steps of the method are executed within an ordered chain of acquisition and calculation modules that are activated simultaneously and synchronously, said modules comprising, in order:
a first module adapted for capturing and controlling the recording or storing of each multispectral image;
a second module adapted for calculating the first-order and second-order integral images for each multispectral image, and for controlling the recording or storing of each first- or second-order integral image;
a third module adapted for calculating, for each multispectral image, the two mean vectors for the target area and for the background area respectively, for each pixel of said multispectral image within the working area; and
a fourth module adapted for calculating, for each multispectral image and for each pixel of said multispectral image within the working area, at least the covariance matrix and the inverse covariance matrix,
and wherein the modules operate simultaneously such that each one processes a different multispectral image than those of the other modules, said multispectral images processed simultaneously by the modules being chronologically successive in the video stream in the reverse order to that of the modules in the chain; then the video stream is shifted by one multispectral image relative to the chain of modules, so that the entire video stream is progressively analyzed during repeated simultaneous executions of the modules, separated by shifts of the video stream relative to the chain of modules.

13. A computer program product, comprising a non-transitory medium readable by one or more processors, and code written on said medium and able to cause said one or more processors to execute a method for analyzing a multispectral image, said multispectral image comprising a plurality of spectral images of the same scene but corresponding to different spectral ranges, each spectral image assigning an intensity value to each pixel located at an intersection of a row and a column of a matrix of the multispectral image, and an origin point being defined at a corner of the peripheral boundary of the matrix;

wherein a detection image is constructed by assigning a display value to each pixel of a working area of the matrix, said display value being obtained from a revealing function that quantifies a content shift in the multispectral image between two areas that are determined by said pixel;

the method comprising the steps of:
/1/ calculating integral images of at least one of the following types:
for each spectral image, a first-order integral image, by assigning to each calculation pixel an integral value equal to the sum of the intensity values of said spectral image for all pixels contained within a rectangle having two opposite vertices respectively located on the origin point and on said calculation pixel;
for each pair of spectral images obtained from the multispectral image, a second-order integral image, by assigning to each calculation pixel another integral value equal to the sum, for all pixels contained within the rectangle having two opposite vertices respectively located on the origin point and on said calculation pixel, of products of the two intensity values relative to the same pixel but respectively assigned by each spectral image of the pair;

/2/ defining a fixed window frame and a mask internal to the frame, said mask defining a target area and a background area within said frame; and /3/ for each pixel of the working area of the matrix, performing the following sub-steps:

/3-1/ placing a window at a position in the matrix that is determined by the pixel, said window being delimited by the frame defined in step /2/, /3-2/ using the integral values read from the integral images calculated in step /1/ to determine a value of the revealing function that quantifies the content shift in the multispectral image between the target area and the background area within the window, in the position determined by said pixel; and /3-3/ assigning the value of the revealing function, calculated in sub-step /3-2/, to the pixel for which step /3/ is performed, wherein the display value is obtained from the value of the revealing function, for each pixel in the detection image, using one or a combination of the following methods:

comparing the value of the revealing function to a threshold, and the display value is set to zero if said value of the revealing function is below the threshold, otherwise said display value is set to said value of the revealing function; or applying a linear scale conversion to the value of the revealing function, and the display value is set to the result of the conversion.

14. A method for the surveillance of an environment, comprising the steps of:

simultaneously capturing a plurality of spectral images of the environment, in order to obtain a multispectral image;

analyzing the multispectral image using the method according to claim 1; and displaying the detection image on a screen, for a surveillance operator who is monitoring the screen.

15. The method according to claim 14, further comprising a comparison of the display value of each pixel in the detection image with an alert threshold, and wherein a pixel is also displayed in the detection image with a modified color, with flashing, or with an overlay, if the display value of said pixel exceeds the alert threshold.

16. A device for surveillance of an environment, configured to:

analyze a multispectral image, said multispectral image comprising a plurality of spectral images of the same scene but corresponding to different spectral ranges, each spectral image assigning an intensity value to each pixel located at an intersection of a row and a column of a matrix of the multispectral image, and an origin point being defined at a corner of the peripheral boundary of the matrix;

wherein a detection image is constructed by assigning a display value to each pixel of a working area of the matrix, said display value being obtained from a revealing function that quantifies a content shift in the multispectral image between two areas that are determined by said pixel;

wherein the analysis comprises the steps of:

/1/ calculating integral images of at least one of the following types:

for each spectral image, a first-order integral image, by assigning to each calculation pixel an integral value equal to the sum of the intensity values of said spectral image for all pixels contained within a rectangle having two opposite vertices respectively located on the origin point and on said calculation pixel;

for each pair of spectral images obtained from the multispectral image, a second-order integral image, by assigning to each calculation pixel another integral value equal to the sum, for all pixels contained within the rectangle having two opposite vertices respectively located on the origin point and on said calculation pixel, of products of the two intensity values relative to the same pixel but respectively assigned by each spectral image of the pair;

/2/ defining a fixed window frame and a mask internal to the frame, said mask defining a target area and a background area within said frame; and /3/ for each pixel of the working area of the matrix, performing the following sub-steps:

/3-1/ placing a window at a position in the matrix that is determined by the pixel, said window being delimited by the frame defined in step /2/;

/3-2/ using the integral values read from the integral images calculated in step /1/ to determine a value of the revealing function that quantifies the content shift in the multispectral image between the target area and the background area within the window, in the position determined by said pixel; and /3-3/ assigning the value of the revealing function, calculated in sub-step /3-2/, to the pixel for which step /3/ is performed, wherein the display value is obtained from the value of the revealing function, for each pixel in the detection image, using one or a combination of the following methods:

comparing the value of the revealing function to a threshold, and the display value is set to zero if said value of the revealing function is below the threshold, otherwise said display value is set to said value of the revealing function; or applying a linear scale conversion to the value of the revealing function, and the display value is set to the result of the conversion;

the device comprising:

means for storing the multispectral image formed of the plurality of spectral images of the same scene but which are associated with separate spectral ranges;

a screen comprising pixels respectively located at the intersections of the rows and columns of the matrix;

an image processing system adapted for calculating the integral images from the spectral images, and for storing said integral images;

means for defining the window frame and the mask internal to the frame; and a calculation system adapted to implement step /3/ of the analysis, and to display the detection image on the screen, wherein each pixel of the working area of the matrix has the display value which is obtained from the value of the revealing function calculated for said pixel.

17. The device according to claim 16, wherein:

step /1/ of the analysis includes calculating the first-order integral images, and sub-step /3-2/ of the analysis includes:

/3-2-1/ using integral values read from the first-order integral images, determining two mean vectors for the target area and for the background area respectively, each having a coordinate, for each spectral image, which is equal to the mean of the intensity values of said spectral image, calculated for the pixels of the target area or of the background area respectively; then /3-2-2/ calculating the value of the revealing function from said two mean vectors;

the means for storing the multispectral image comprises a first module adapted for capturing and controlling the recording or storage of the multispectral image;

the image processing system comprises a second module adapted for calculating the first-order integral images for each multispectral image; and the calculation system comprises a third module adapted for calculating, for each multispectral image, at least the two mean vectors for the target area and for the background area respectively, for each pixel of said multispectral image within the working area, the first, second, and third modules being arranged in order in an ordered chain of modules, and the device further comprising:

a controller adapted for controlling the simultaneous and synchronous operation of the modules in order to analyze a series of successive multispectral images that form a video stream, said modules operating simultaneously such that each one processes a multispectral image that is different from those of the other modules, said multispectral images processed simultaneously by the modules being chronologically successive in the video stream in the reverse order to that of the modules in the chain, and said controller being further adapted for controlling a shift of the video stream by one multispectral image relative to the chain of modules, so that the entire video stream is progressively analyzed during repeated simultaneous executions of the modules, separated by shifts of the video stream relative to the chain of modules.

18. The device according to claim 16, wherein:

step /1/ of the analysis includes calculating the first-order integral images, and sub-step /3-2/ of the analysis includes:

/3-2-1/ using integral values read from the first-order integral images, determining two mean vectors for the target area and for the background area respectively, each having a coordinate, for each spectral image, which is equal to the mean of the intensity values of said spectral image, calculated for the pixels of the target area or of the background area respectively; then /3-2-2/ calculating the value of the revealing function from said two mean vectors;

step /1/ further includes calculating first-order as well as second-order integral images, and in sub-step /3-2-2/, the value of the revealing function is calculated using integral values read from the second-order integral images, in addition to integral values read from the first-order integral images, wherein sub-step /3-2/ includes a determination of a Fisher factor, in the form of a vector associated with a Fisher projection that increases a contrast of the multispectral image, within the window, between the target area and the background area, wherein the Fisher factor is itself calculated in sub-step /3-2/ for each pixel of the working area, from the integral values read from the first- and second-order integral images, wherein the Fisher factor is calculated in step /3-2/ for each pixel of the working area, in the form of a product between a row vector resulting from a difference between the mean vectors calculated for the target area and for the background area, and an inverse covariance matrix, said covariance matrix having a factor, for each pair of spectral images obtained from the multispectral image, which is equal to a covariance of the spectral intensity values respectively assigned by each spectral image of the pair, calculated for the pixels of the background area;

sub-step /3-2/ comprises a calculation of two mean Fisher values for the target area and for the background area respectively, each equal to a dot product of the Fisher factor and of the mean vector for the target area or for the background area respectively;

and the value of the revealing function is dependent on the difference between said two mean Fisher values; and wherein:

the means for storing the multispectral image comprises a first module adapted for capturing and controlling the recording or storage of the multispectral image;

the image processing system comprises a second module adapted for calculating the first-order and second-order integral images for each multispectral image; and the calculation system comprises a third module adapted for calculating, for each multispectral image, the two mean vectors for the target area and for the background area respectively, for each pixel of said multispectral image within the working area, and further comprises a fourth module adapted for calculating, for each pixel of each multispectral image in the working area, at least the covariance matrix and the inverse covariance matrix, the first, second, third, and fourth modules being arranged in order in an ordered chain of modules, and the device further comprising:

a controller adapted for controlling the simultaneous and synchronous operation of the modules in order to analyze a series of successive multispectral images that form a video stream, said modules operating simultaneously such that each one process a multispectral image that is different from those of the other modules, said multispectral images processed simultaneously by the modules being chronologically successive in the video stream in the reverse order to that of the modules in the chain, and said controller being further adapted for controlling a shift of the video stream by one multispectral image relative to the chain of modules, so that the entire video stream is progressively analyzed during repeated simultaneous executions of the modules, separated by shifts of the video stream relative to the chain of modules.

19. The device according to claim 17, wherein the third module itself comprises two sub-modules that are respectively and separately dedicated to calculating the mean vector for the target area and the mean vector for the background area, with simultaneous operation of said sub-modules for each multispectral image and each pixel of said multispectral image within the working area.

20. The device according to claim 19, wherein each module or sub-module comprises at least one dedicated calculation unit.

* * * * *